United States Patent
Thanner et al.

(10) Patent No.: US 7,325,273 B2
(45) Date of Patent: Feb. 5, 2008

(54) SUCTION DEVICE

(75) Inventors: Thomas Thanner, Munich (DE); Norbert Daam, Oberdiessen (DE)

(73) Assignee: Hilti Aktiengesellschaft, Schaan (LI)

( * ) Notice: Subject to any disclaimer, the term of this patent is extended or adjusted under 35 U.S.C. 154(b) by 306 days.

(21) Appl. No.: 11/057,285

(22) Filed: Feb. 11, 2005

(65) Prior Publication Data
US 2005/0188498 A1 Sep. 1, 2005

(30) Foreign Application Priority Data
Feb. 12, 2004 (DE) .................. 10 2004 006 888

(51) Int. Cl.
*A47L 9/14* (2006.01)
(52) U.S. Cl. ............... 15/344; 15/350; 15/412; 30/124; 408/58; 408/67; 409/137; 409/182; 409/219
(58) Field of Classification Search ............... None
See application file for complete search history.

(56) References Cited

U.S. PATENT DOCUMENTS

| 4,385,897 | A | * | 5/1983 | Mallet ..................... 464/89 |
| 4,465,446 | A | * | 8/1984 | Nemit et al. ............. 418/201.1 |
| 5,199,501 | A |   | 4/1993 | Kluber et al. |
| 5,558,491 | A | * | 9/1996 | Andrews .................. 415/111 |
| 6,155,246 | A |   | 12/2000 | Yamami et al. |
| 6,851,898 | B2 | * | 2/2005 | Ege et al. .................. 408/67 |
| 7,047,647 | B1 | * | 5/2006 | Muller et al. .............. 30/124 |
| 2005/0126010 | A1 | * | 6/2005 | Baxivanelis et al. ........ 30/124 |

FOREIGN PATENT DOCUMENTS

DE 0153939 5/2003

OTHER PUBLICATIONS

Patent Abstract of Japan, JP- 10 231 845 A, Sep. 1998.
Search Report.

* cited by examiner

*Primary Examiner*—David Redding
(74) *Attorney, Agent, or Firm*—Abelman, Frayne & Schwab

(57) ABSTRACT

A suction device (2) for a hand-held power tool and which is releasably connected with the power tool, includes a suction blower wheel (20) for producing a suction air stream in a suction path (S) and located in the device housing (10), a rolling bearing (28) for supporting the suction blower wheel (20) in the device housing (10), a blower shaft (26) for driving the suction blower wheel (20), and a drive coupling (38) for rotatably frictionally connecting the blower shaft (26) with the drive shaft (42) of the hand-held power tool (4) in a connected condition of the drive shaft (42) with the blower shaft (26).

10 Claims, 3 Drawing Sheets

SUCTION DEVICE

BACKGROUND OF THE INVENTION

1. Field of the Invention

The present invention relates to a suction device for a hand-held power tool, in particular, a compass saw and which is releasably connectable with the power tool and includes a suction blower wheel for producing a suction air stream in a suction path and located in the device housing, a rolling bearing for supporting the suction blower wheel in the housing, a blower shaft for driving the suction blower wheel, and a drive coupling for rotatably connecting the blower shaft with the motor-driven drive shaft of the hand-held power tool.

2. Description of the Prior Art

Suction devices of the type described above are mounted, when necessary, on respective hand-held power tool for aspirating and collecting refuse which is produced during working of workpieces, e.g., chips, drillings, sawdust, etc. With the blower shaft being coupled with the drive shaft of the hand-held power tool, the suction device does not need its own drive, and the suction device can be produced with a low weight and small dimensions.

German Publication DE 40 24 022 discloses a suction device for a drilling or chiseling tool in which the drive coupling is provided by a slot-shaped recess of the drive shaft in which a blade-shaped projection of the blower shaft engages. The blower shaft is supported in the blower housing with a possibility of axial displacement and is pressed into engagement with the drive shaft, in a mounted condition of the suction device, by a spring. With such drive coupling means, a reliable drive of the suction blower wheel with a high efficiency is achieved. However, for certain hand-held power tools, upon mounting of the suction device on the hand-held power tool, certain dimensional tolerances with regard to the axial spacing between the two elements and the coaxial arrangement of both shafts should be maintained which, however, are not always can be insured upon mounting of a suction device on the hand-held power tool each time.

The danger of angular deviation between the two shafts is always present when the suction device is mounted on a hand-held tool, e.g., a compass saw, so that the shafts are arranged transverse to the gravity force during a normal operation. A certain tilting and an axial displacement between the suction device and the hand-held power tool can take place as a result of action of the gravity force on the suction device. These axial and angular deviations produce constraining forces during operation which result in a high wear of components of both the suction device and the hand-held power tool.

Furthermore, the unit blower shaft-suction blower wheel is subjected to high loads, in particular, upon turning the motor on, because the drive of the hand-held power tool, as a rule, is not adjusted for an optimal run of the suction blower wheel. This also increases the wear of the suction device which results in its reduced service life.

Accordingly, an object of the present invention is to provide a suction device in which the drawbacks of the prior art devices are eliminated and the service life of the suction device is increased.

SUMMARY OF THE INVENTION

This and other objects of the present invention, which will become apparent hereinafter, are achieved by providing a drive coupling that frictionally connects the drive shaft with the blower shaft for transmitting rotational movement in a connected condition of the drive shaft with the blower shaft.

The frictional connection of the drive shaft with the blower shaft prevents overloading of the unit blower shaft-suction blower wheel because slippage between the two shafts can take place when the maximum torque is exceeded. Moreover, with a pure frictional torque transmission, large dimensional tolerances between the hand-held power tool and the mounted thereon, suction device can be compensated, so that no constraining forces act on the suction device. As a result, the service life of the suction device can be extended.

Advantageously, the drive coupling has a first coupling member which has an elastic friction element that applies pressure to a second coupling member of the drive coupling for effecting a frictional connection in the connected condition of the drive shaft with the blower shaft. The friction element permits to easily adjust a maximum torque that can be transmitted by the drive coupling.

According to a particularly advantageous embodiment of the present invention the elastic friction element is formed as a rubber sleeve supported on the blower shaft and having a cylindrical chamber for receiving the drive shaft and a diameter of which is slightly smaller than an outer diameter of the drive shaft. The rubber sleeve, upon mounting of the suction device on the hand-held power tool, is expanded by the drive shaft, which has a slighter greater diameter, with the inner surface of the sleeve applying pressure to the drive shaft. In this way, a reliable and uniform distribution of friction over the circumference of the drive shaft is provided, which insures a transmission of a sufficiently large torque for driving the suction device from the drive shaft to the blower shaft.

Advantageously, the rubber sleeve forms, with the blower shaft, a formlocking connection in a rotational direction. The formlocking connection insures a particularly rigid connection of the blower shaft with the rubber sleeve which functions as a suction device side, coupling member.

Advantageously, a rigid outer sleeve is pushed over the rubber sleeve. The outer sleeve can be formed, e.g., as a metal sleeve that does not have any noticeable elasticity or deformation at the contemplated operational conditions. In this way, on one hand, a particularly reliable retention of the rubber sleeve on the blower shaft is achieved. On the other hand, the rigid outer sleeve insures an exact coaxial alignment of the drive shaft with the blower shaft.

Advantageously, the rolling bearing is spaced form the housing by a predetermined clearance providing for tilting movement of the rolling bearing about a tilt axis that extends transverse to blower shaft axis. In this way, a slight tilting of the rolling bearing relative to the blower housing prevents appearance of constraining forces that otherwise would have been produced with a rigid connection of the two shafts by the outer sleeve upon angular deviations between the hand-held power tool and the suction device.

Preferably, the roller bearing is supported against the housing by an intermediate elastic support element. This permits to provide a tilting clearance with simple and economical means.

Advantageously, the elastic support element is formed as an O-ring which permits to produce a radial clearance in a simple manner, which noticeably reduces manufacturing costs. In addition, the elastic support element prevents rotation of the bearing outer ring relative to the housing.

Preferably, the rolling bearing is arranged, in an axial direction, between a snap ring retained on the housing and a wave ring clamped between the housing and the rolling bearing. This provides a predetermined resistance to the tilting movement of the rolling bearing.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

DETAILED DESCRIPTION OF THE PREFERRED EMBODIMENT

Figure 1:
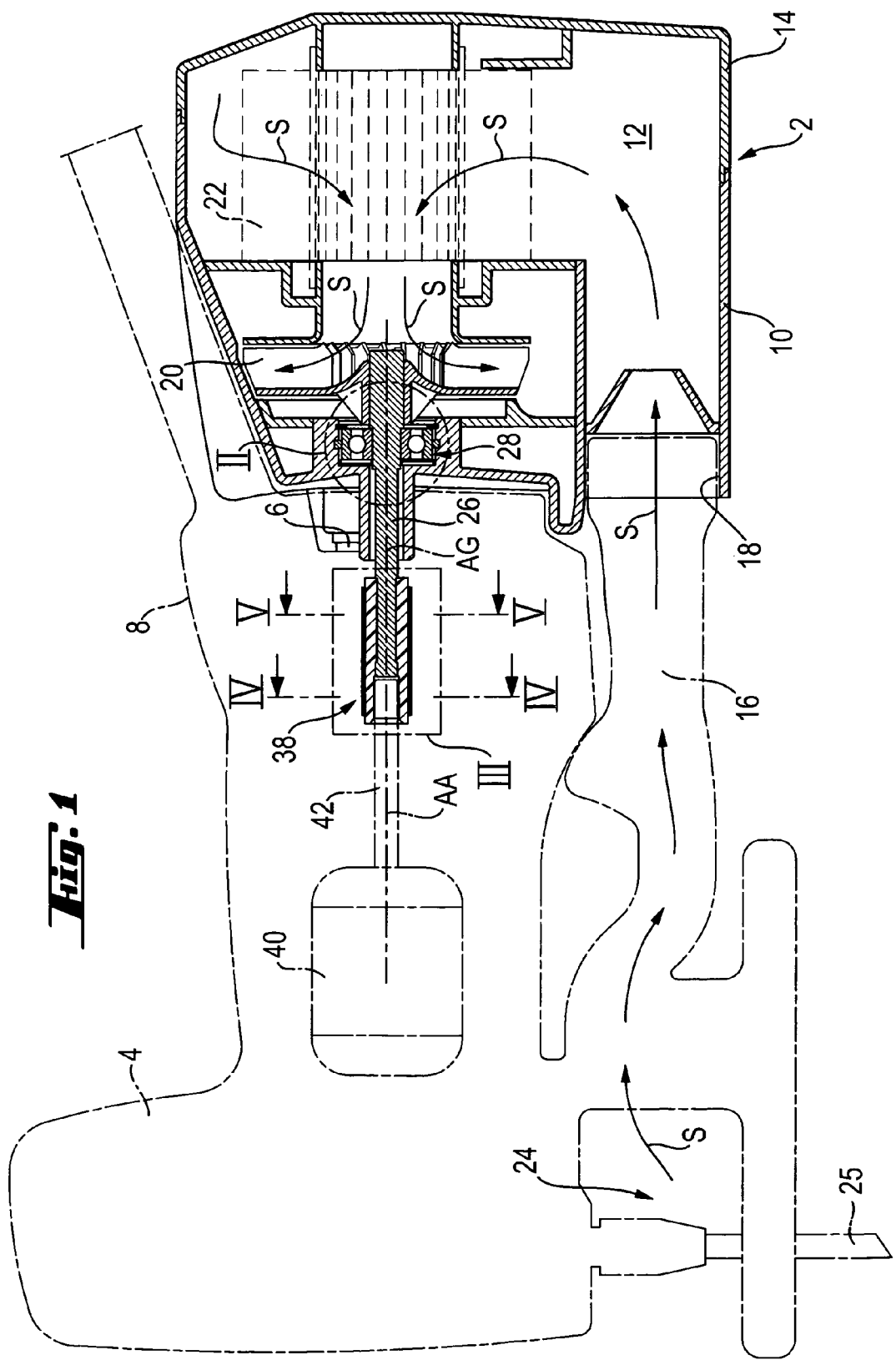
FIG. 1 a longitudinal, partially cross-sectional view of a suction device according to the present invention.

FIG. 1 shows a suction device 2 according to the present invention and which is mountable on a hand-held power tool 4 which is shown with dash-dot lines and which is formed, e.g., as a compass saw. The suction device 2 is provided with flexible locking hooks 6 which snap in releasably in locking recesses on a housing 8 of the hand-held power tool 4. The suction device 2 has a housing 10 that encloses a collection chamber 12 which serves for collecting chips and sawdust. In the region of the collection chamber 12, the housing 10 has a cover 14 removable from the housing 10 for emptying the collection chamber 12.

The collection chamber 12 is arranged in the suction path which is shown with arrow S and which extends through a suction tube 16 of the hand-held power tool 4, which is received in a tube receptacle 18 of the housing 10, and up to suction blower wheel 20 arranged in the housing 10. A replaceable filter element 22, which is shown with dash lines, is provided between the collection chamber 12 and the blower wheel 20.

The suction blower wheel 20 serves for producing a suction air stream along the suction path S and which carries chips and sawdust, which are produced during the operation of the hand-held power tool 4, from the working space 24 in the region of the cutting tool 25 through the suction tube 16 and into the collection chamber 12. The filter element 22 separates the chips and the sawdust from the pure air that flows through the filter element 22 toward the blower wheel 20 and therefrom into the environment through slots (not shown) which are formed in the suction device housing 10.

Figure 2:
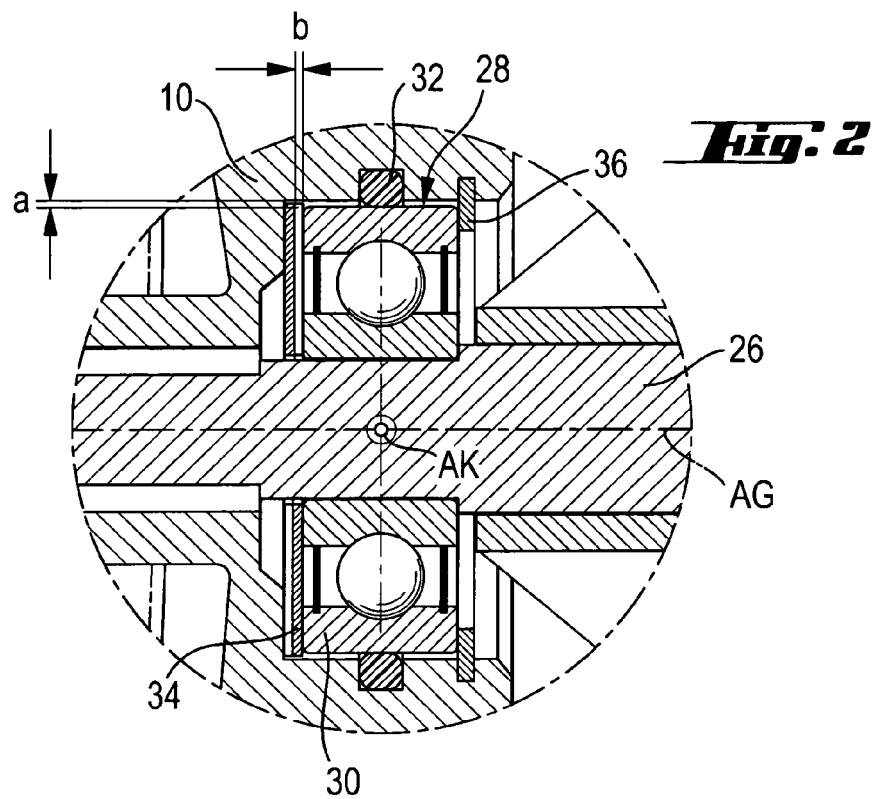
FIG. 2 a detailed cross-sectional view through a rolling bearing of the inventive suction device.

The suction blower wheel 20 is secured on a blower shaft 26 for joint rotation therewith. The blower shaft 26 is rotatably supported in the housing 10 by a rolling bearing 28 which is press-fit thereon and which is formed as a ball bearing shown in FIG. 2 at an increased scale. The bearing outer ring 30 is supported in the housing 10 in a radial direction by an intermediate flexible O-ring 32 and, as a result, a radial clearance a of about 0.2 mm is formed between the rolling bearing 28 and the housing 10.

Parallel to the axis AG of the blower shaft 26, a wave ring 34 applies pressure against the rolling bearing 28 which is supported against the housing 10. At its side remote from the wave ring 34, the bearing outer ring 30 is supported, in the axial direction against a snap ring 36 that engages the housing 10. The rolling bearing 28 has, with respect to the biasing force of the wave ring 34, an axial clearance b likewise of about 0.2 mm.

Due to clearances a and b, the rolling bearing 28 can slightly tilt relative to the housing 10 about a tilt axis AK that extends transverse to the blower wheel shaft axis AG.

For driving the blower shaft 26, it is rotatably connected, as shown in FIG. 1, with the drive shaft 42 of the motor 40 by a drive coupling 38.

Figure 3:
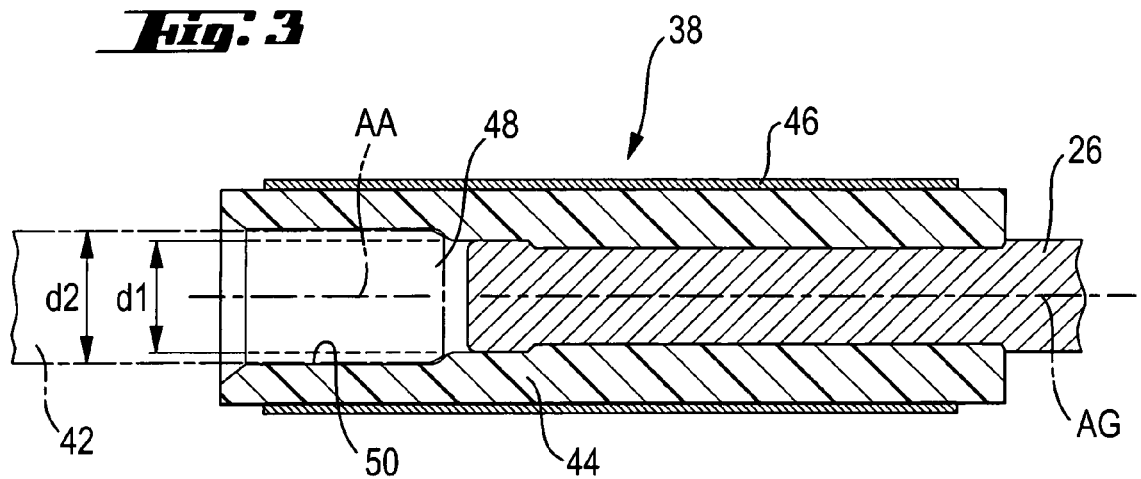
FIG. 3 a detailed cross-sectional view through a drive coupling used with the inventive suction device.

As particularly, shown in FIG. 3, the drive coupling 38 has a rubber sleeve 44 that is pinned on the blower shaft 26. In order to fixedly secure the rubber sleeve 44 on the blower shaft 26 in the axial direction, a rigid metal outer sleeve 46 is pulled over the rubber sleeve 44. The rigid sleeve 46 provides for pressing of the rubber sleeve 44 against the outer diameter of the blower shaft 26.

Figure 4:
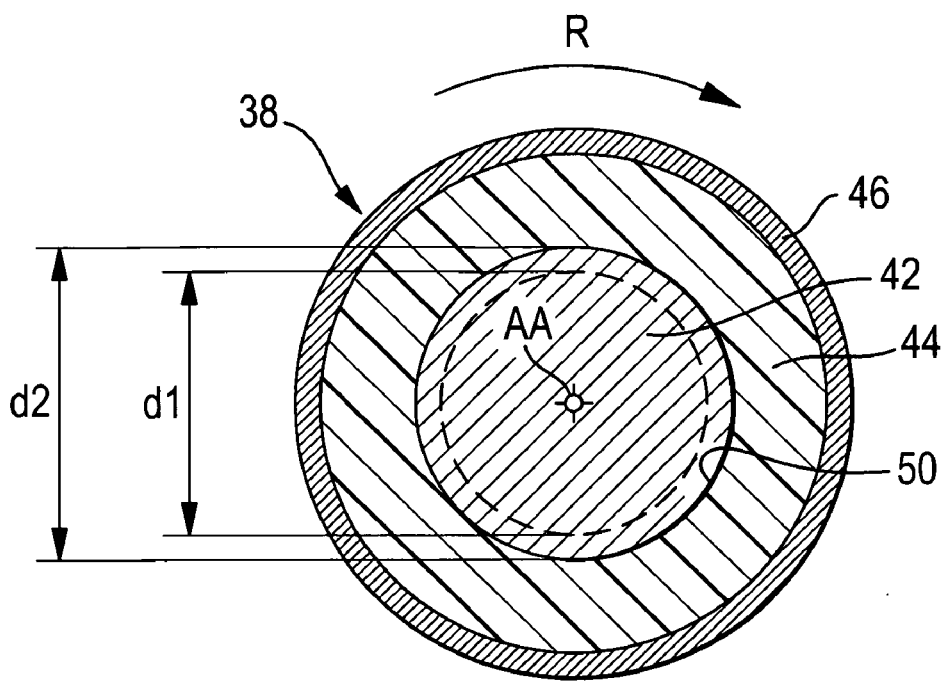
FIG. 4 a cross-sectional view along line IV-IV through the drive coupling shown in FIG. 3 at the height of a cylindrical receiving space of a rubber sleeve.

At its drive shaft end, the rubber sleeve 44 forms, as shown in FIGS. 3 and 4, a cylindrical receiving chamber 48 into which the drive shaft 42 is inserted. In an unloaded condition of the rubber sleeve 44, the receiving chamber 48 has a diameter d1, shown with dash lines, which is somewhat smaller than the diameter d2 of the drive shaft 42.

When the suction device 2 is mounted on the hand-held power tool 4 and the drive shaft 42 is simultaneously inserted in the receiving chamber 48, the rubber sleeve 44 becomes deformed, with the inner surface 50 of the receiving chamber 48 applying pressure to the drive shaft 42.

Alternatively, the rubber sleeve 44 can be fixedly secured on the drive shaft 42, with the rubber sleeve 44 becoming connected with the blower shaft 26 upon mounting of the suction device 2 on the hand-held power tool 4.

In this way, a frictional connection in the rotational direction R is formed between the rubber sleeve 44, which forms a first coupling member, and an end of the drive shaft 42 remote form the motor 40, which forms a second coupling member.

The frictional connection proved to be adequate for driving the blower shaft 26 and the mounted thereon, blower wheel 20 upon rotation of the drive shaft 42 about a drive axis AA, i.e., sufficient for generating an adequate suction air flow along the suction path S.

On the other hand, the pure frictional connection, which provides for transmission of the drive torque, insures that a slippage takes place between the drive shaft 42 and the blower shaft 26 when the maximum torque is exceeded, e.g., when the motor 40 is driven with a high speed out of its idle position. This prevents damage of the unit: blower shaft 26-suction blower wheel 20.

Figure 5:
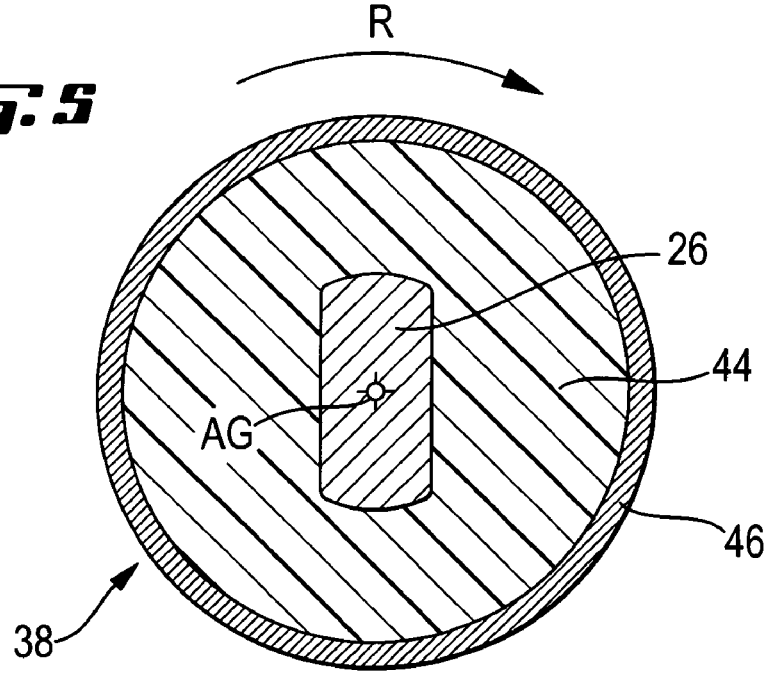
FIG. 5 a cross-sectional view along line V-V through the drive coupling shown in FIG. 3 at the height of formlocking connection between the rubber sleeve and the blower shaft.

In order to insure a reliable torque transmission between the rubber sleeve 44 and the blower shaft 26, the blower, shaft 26 has in its region, on which the rubber sleeve 44 is pinned, a connection cross-section that deviates from a circular form, and which is insertable in a correspondingly formed opening of the rubber sleeve 44, as shown in FIG. 5. In this way, a formlocking connection in a rotational direction R between the rubber sleeve 44 and the blower shaft 26 is formed.

A rigid out sleeve 46, which is pulled over the rubber sleeve 44, provides for a coaxial alignment of the blower shaft axis AG and drive axis AA. In case when the suction device 2 is mounted on the hand-held tool 4 with a certain inclination with respect to an ideal position, the deviation will be compensated by a slight tilt of the rolling bearing 28 relative to the housing 10. Thereby, constraining forces, which act on the suction device as a result of a rigid connection of the two shafts 26, 42, are prevented.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A suction device configured to be releasably connected to a hand-held power tool (4) having a drive shaft (42), comprising:
    a housing (10);
    a suction blower wheel (20) for producing a suction air stream in a suction path (S) and located in the housing (10);
    a rolling bearing (28) for supporting the suction blower wheel (20) in the housing (10);
    a blower shaft (26) for driving the suction blower wheel (20); and
    a drive coupling (38) for rotatably and axially connecting the blower shaft (26) with the drive shaft (42) of the hand-held power tool (4), the drive coupling (38) frictionally connecting the drive shaft (42) with the blower shaft (26) for transmitting rotational movement in a connected condition of the drive shaft (42) with the blower shaft (26), wherein the drive coupling (38) circumscribes said drive shaft (42) and blower shaft (26) and includes a first coupling member (46) and a second coupling member (44), said second coupling member having an elastic friction element frictionally engaging the drive shaft (42) and the blower shaft (26) in the connected condition thereof.

2. A suction device according to claim 1, wherein said first coupling member (46) surrounds and applies pressure to said second coupling member (44) to maintain a frictional connection of said second coupling member (44) with the drive shaft (42) and the blower shaft (26).

3. A suction device according to claim 2, wherein the elastic friction element is formed as a rubber sleeve (44) supported on the blower shaft (26) and having a cylindrical chamber (48) for receiving the drive shaft (42) and a diameter (dl) of which is slightly smaller than an outer diameter (d2) of the drive shaft (42).

4. A suction device according to claim 3, wherein the rubber sleeve (44) forms, with the blower shaft (26), a form-locking connection in a rotational direction (R).

5. A suction device according to claim 3, wherein the first coupling member comprises a rigid outer sleeve (46) circumscribing the rubber sleeve (44).

6. A suction device according to claim 1, wherein the rolling bearing (28) is spaced form the housing (10) by a predetermined clearance that provides for tilting movement of the rolling bearing (28) about a tilt axis (AK) that extends transverse to a blower shaft axis (AG).

7. A suction device according to claim 1, wherein the roller bearing (28) is supported against the housing (10) by an intermediate elastic support element.

8. A suction device according to claim 7, wherein the intermediate elastic support element is formed as an O-ring (32).

9. A suction device according to claim 1, wherein the rolling bearing (28) is arranged, in an axial direction, between a snap ring (36) retained on the housing (10), and a wave ring (34) clamped between the housing (10) and the rolling bearing (28).

10. A suction device according to claim 1, further comprising a locking mechanism (6) for releasably coupling said housing (10) of the suction device to said hand-held power tool (4).

* * * * *